(12) United States Patent
Komatsu

(10) Patent No.: US 6,395,420 B1
(45) Date of Patent: May 28, 2002

(54) BATTERY SEALED IN BATTERY CASE OF RESIN FILM

(75) Inventor: Shigeo Komatsu, Kyoto (JP)

(73) Assignee: Japan Storage Battery Co., Ltd., Kyoto (JP)

(*) Notice: Subject to any disclaimer, the term of this patent is extended or adjusted under 35 U.S.C. 154(b) by 0 days.

(21) Appl. No.: 09/552,716

(22) Filed: Apr. 19, 2000

(30) Foreign Application Priority Data

Apr. 19, 1999 (JP) ............................................. 11-111374
May 19, 1999 (JP) ............................................. 11-138335
May 19, 1999 (JP) ............................................. 11-138569

(51) Int. Cl.⁷ ............................................. H01M 2/02
(52) U.S. Cl. ................. 429/164; 429/163; 429/162; 429/174; 429/181; 429/185; 429/127; 429/131
(58) Field of Search ................. 429/164, 163, 429/162, 174, 131, 181, 127, 185

(56) References Cited

U.S. PATENT DOCUMENTS 4,664,994 A * 5/1987 Koike et al. ................. 429/163
4,678,725 A * 7/1987 Kikuchi et al. ................. 429/53

FOREIGN PATENT DOCUMENTS

JP 2000090897 * 3/2000 ............ H01M/2/10

* cited by examiner

*Primary Examiner*—Gabrielle Brouillette
*Assistant Examiner*—Angela J. Martin
(74) *Attorney, Agent, or Firm*—Sughrue Mion, PLLC

(57) ABSTRACT

A lead is connected to the electrode plate of the power generating element, and exposed externally from the deposited portion of a battery case. The portion of the lead crossing film edges is covered with two flat insulating covering resins which are thermally deposited to each other. At this portion, the covering resins and film edges are thermally deposited to each other. The covering resin is composed of two layers of an outer layer and an inner layer. At least the outer layer is colored and crosslink-coupled by irradiation of electron beams. The outer layer has a higher softening point than the inner layer.

13 Claims, 2 Drawing Sheets

BATTERY SEALED IN BATTERY CASE OF RESIN FILM

BACKGROUND OF THE INVENTION

1. Field of the Invention

The present invention relates to a battery having a structure with a power generating element sealed in a battery case of a resin film and a lead externally extended.

2. Description of the Related Art

Conventionally, some batteries such as a lithium ion battery incorporated in a compact electronic appliance such as a portable telephone, a portable personal computer, a portable video camera, etc. have a structure with a power generating element sealed in a flat battery case of a resin film and a lead externally extended. The above resin film of the battery case is formed of a laminated film of a metallic foil and a resin film. The laminated resin film is formed to be a cylinder, and a lead is externally extended from one of the openings of the cylinder. The battery case is hermetically sealed in such a manner that both edges of the one opening are deposited to each other and both edges of the other opening of the cylindrical laminated film are also deposited to each other. At the extended portion of the lead, the internal faces of the film is kept in contact with the lead, and at the other portion thereof, the internal faces of the film are kept in contact with each other. In this way, the hermeticity of the battery is maintained.

The battery having such a structure can be produced as follows.

First, a predetermined portion of the lead is covered with resin, and the lead is connected to the electrode of a power generating element. The lead is wrapped with the film serving as a material of the battery case so that it is partially exposed. In this case, the power generating element and lead must be positioned so that the edges of the film and the covering resin cross each other. At the one end of the lead, the edges of the film are deposited to each other, and the edges of the film and the covering resin are deposited to each other. On the other hand, at the other end of the lead, with the edges of the film being opened, electrolyte is injected and thereafter they are deposited to each other.

However, when the edges of the film and the covering resin are deposited to each other, if the quantity of heat to be applied is insufficient, they are not brought into intimate contact with each other, thus reducing the hermeticity between the lead and resin. Inversely, if heat is excessively applied, the portion of the resin on the side of a heat source will be deformed before the resin is deposited to the lead. Thus, the hermeticity between the battery case and the resin will be reduced and the resin will be deposited to the heat source. This leads to reduction of a production yield. Further, if the resin is molten excessively, the lead may be brought into contact with the metallic foil constituting the laminate film so that a lead of a positive electrode and another lead of a negative electrode are short-circuited to each other through the metallic foil.

Further, when the power generating element and the lead are wrapped with the film, it is not easy to position them accurately so that they are misaligned with each other. Then, the film and the covering resin of the lead are not in intimate contact with each other so that the hermeticity therebetween may be lowered. In addition, the end of the power generating element is excessively pressed by the battery case so that the power generating element may be deformed and the lead may be broken.

SUMMARY OF THE INVENTION

It is an object of the present invention to provide a battery which can suitably perform film deposition to provide high hermeticity and provide excellent insulation between leads with positive and negative electrodes.

It is another object of the present invention to provide a battery which can position a lead and a film accurately to provide high degree of hermeticity.

The battery according to the invention has a structure in which a power generating element is housed in a battery case of a resin film, a prescribed portion of a lead is covered with a covering resin, and the power generating element is sealed by deposition between edges of the film constituting the battery case and between said covering resin and the edges of the film. The softening point of the deposited portion of the covering resin to the laminate film, i.e. the outer portion of the covering resin is made higher than that of the inner portion thereof.

In the battery according to the invention, the deposited portion of the covering resin covering the lead to the film edges has a high softening point. Therefore, the covering portion of the resin with the film edges is difficult to deform at a high temperature during thermal deposition and hence a predetermined thickness thereof is assured. Excellent hermeticity of the deposited portion can be obtained between the covering resin and film edges so that the leads of a positive electrode and a negative electrode are insulated from each other by the covering resin.

An example of the invention is to crosslink-couple the outer portion of said covering resin.

The resin is crosslink-coupled preferably by irradiation of electron beams rather than using a crosslinking agent. This is based on the following reason. In the case of using the crosslinking agent, the resin must be crosslinked at a higher temperature than the melting point and further supported by a support. On the other hand, in the case of the irradiation of electron beams, the resin can be crosslink-coupled at both low and high temperatures and does not require the support.

The covering resin may be composed of a plurality of layers stacked in its thickness direction so that the outermost layer has a higher softening point than the innermost layer. In this configuration, in order to bring the covering resin into intimate contact with the lead, with a heat source being in pressure-contact with the outermost layer of the covering resin, heat and pressure are applied toward the lead. Then, the temperature of the innermost layer of the resin reaches a softening point before that of the outermost layer of the resin does. As a result, the innermost layer is deposited to the lead. Thus, the resin on the side of the heat source does not become deformed and the resin is also not deposited to the heat source.

The specific technique of making the outermost layer have a higher softening point than the innermost layer includes to irradiate the outermost layer of the laminated covering resin composed of a plurality of resin films with electron beams, to laminate a plurality of resin films including the outermost layer crosslinked by irradiation of electron beams, etc.

The covering resin is preferably formed of denatured polyolefine. Its more preferable example is acid-denatured polyethylene. When the covering resin is acid-denatured polyethylene, whether or not it has been crosslink-coupled can be known by checking the gel percent of the insoluble part when it is dissolved in xylene or checking the thermal deformation.

The crosslinking degree is preferably 20%–95% (inclusive), more preferably, 30 to 80%, in terms of the gel percent. The reason thereof is follows. Namely, if the covering resin is insufficiently crosslinked, it will be dissolved so that its shape cannot be maintained and will be reduced in thickness. Inversely, if the covering resin is excessively crosslinked, the deposition of the resin to the film becomes difficult. In both cases, the hermeticity is reduced.

In the case of employing the thermal deformation, for example, with certain load applied to the resin, its temperature is boosted to 200° C. The thickness at this time is measured. If the thickness is in a range of 50–60% of that before the temperature is boosted, it may be admitted that the resin is crosslink-coupled.

The difference between the softening points of the innermost and outermost layers is preferably 5° C.–100° C., more preferably, 5° C.–30° C., (inclusive) when the covering resin is composed of only these two layers and the thickness of each of these layers is 10–200 μm. This is based on the following reason. If the difference is less than 5° C., the function of the resin described above can not be sufficiently shown. Inversely, if the difference exceeds 100° C., even if the innermost layer is brought into intimate contact with the lead, the outermost layer, whose softening point is too high, cannot be brought into contact with the battery case. Even if the outermost layer is in a state capable of being brought into contact with the battery case, the viscosity of the innermost layer is lowered so that the resin flows to a point far from the lead. As a result, the contact strength between the resin and the lead is lowered.

The covering resin is preferably colored. Then, the position of the resin can be visually inspected or optically detected. Therefore, the position of the lead covered with the covering resin can be accurately known. Thus, the lead can be caused to cross the film edges. In addition, when the power generating element and lead are wrapped with the film, the positions of them can be determined accurately. Accordingly, the power generating element can be covered with the film at the edges thereof without being pressurized.

If the resin is colored, the positioning can be automated using optical detection.

DESCRIPTION OF THE PREFERRED EMBODIMENTS

Figure 1:
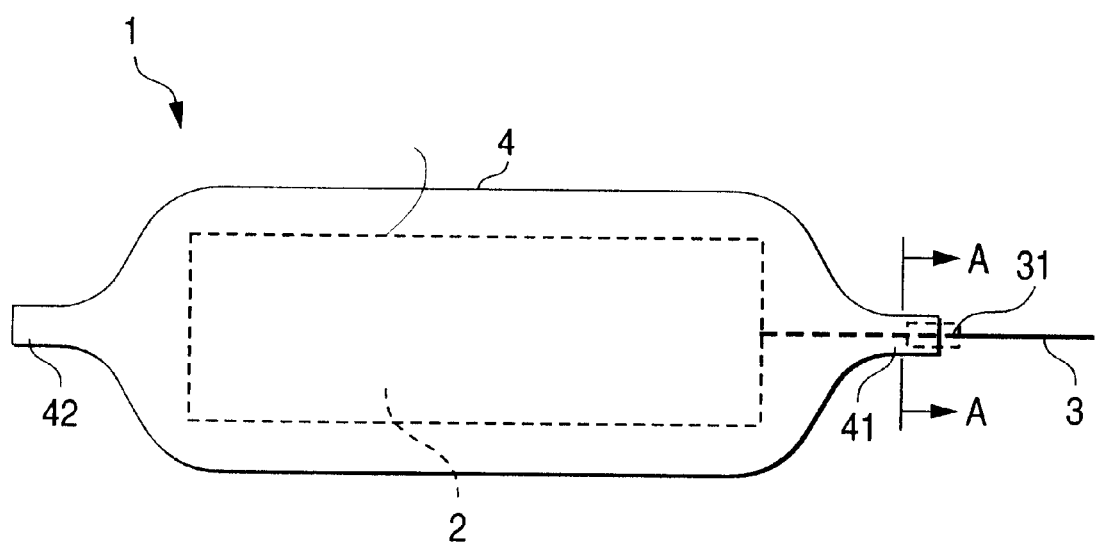
FIG. 1 is a front view of a battery.
Figure 2:
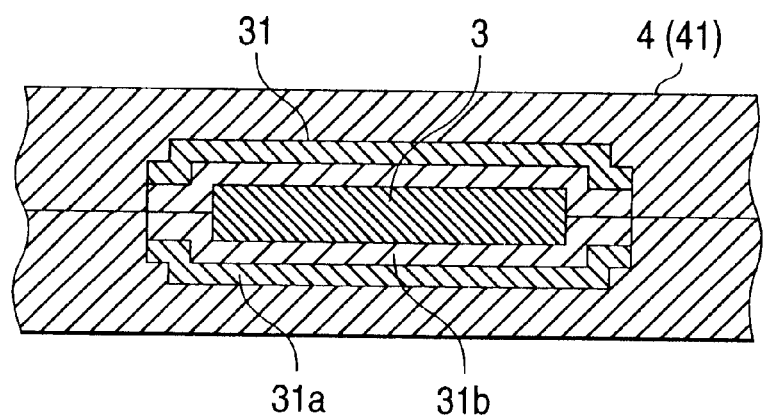
FIG. 2 is a sectional view taken in line A—A in FIG. 1.

Now referring to the drawings, an explanation will be given of an embodiment of the invention. FIG. 1 is a front view of a battery, and FIG. 2 is a sectional view taken in line A—A in FIG. 1. A battery according to this embodiment includes a power generating element 2, a lead 3 and a battery case 4.

The power generating element 2 may be a lithium ion type in which a positive electrode plate with a collector to which active material is applied, a separator holding an electrolytic solution and a negative electrode plate with a collector to which host material is applied are stacked sequentially and spirally wound.

The battery case 4 housing the power generating element is made of a laminated film composed of a surface protection layer of resin, a barrier layer of a metallic film and a deposition layer of resin which are successively stacked from the outside, and is formed by thermally depositing the edges of the film to each other. In this embodiment, it is assumed that the surface protection layer is made of PET having a thickness of 12 μm, the barrier layer is made of an aluminum layer having a thickness of 25 μm and the deposition layer is made of PP having a thickness of 60 μm.

The lead 3 has a planar shape of e.g. aluminum or copper. The lead 3 is connected to the electrode plate of the power generating element 2, and exposed externally from the deposited portion of the battery case 4. The portion of the lead 3 crossing the edges of the film (the "prescribed portion") is covered with two flat insulating covering resins 31 which are thermally deposited to each other. At this portion, the covering resins 31 and film edges 41 are thermally deposited to each other. Thus, the hermeticity within the battery case is maintained. In addition, it is possible to prevent lead 3 and the barrier layer of the battery case 4 from being brought into contact with each other and short-circuited to each other.

The covering resins 31 is composed of two layers of an outer layer 31a and inner layer 31b. In this embodiment, both layers are made of acid-denatured low-density polyethylene which is an example of denatured polyolefine. The outer layer 31a is a crosslink-coupled portion, and has a higher softening point than the inner layer 31b. Specifically, the softening points of the outer layer 31a and 31b are 137° C. and 95° C., respectively, which are relied on JAPANESE INDUSTRIAL STANDARD K7206. Incidentally, the resin can be crosslink-coupled in such a way that it is irradiated with electron beams. Whether or not it is crosslink-coupled can be known by examining its thermal deformation. For example, under a certain load on the resin, when the resin is heated to its melting point or higher (200° C. in the case of polyethylene). The resultant thickness of the resin is measured. If the thickness is in a range of 50–60% of that before heated, it may be admitted the resin is crosslink-coupled.

The outer layer 31a of the covering resin 31 is colored. The resin can be colored by mixing coloring agent with it by means of techniques of dry coloring, color compound, etc. The coloring agent may be carbon black, phthalocyanine blue phthalocyanine green, anthraquinone, cobalt aluminate, ceramic black, carbazole dioxazine, etc. The adding amount of the coloring agent is preferably 0.1–5 wt %. Where the adding amount is less than 0.1%, the degree of coloring is low, thus making it difficult to detect the color optically. Where the adding amount is more than 5 wt %, the depositing strength during thermal deposition is lowered, thus leading to reduction of the hermeticity.

The covering resin 31 can be fabricated in such a way that resin films having larger widths which are materials of the outer layer 31a and inner layer 31b are superposed on each other, laminated using a hot roll, and cut into a prescribed width.

Figure 3:
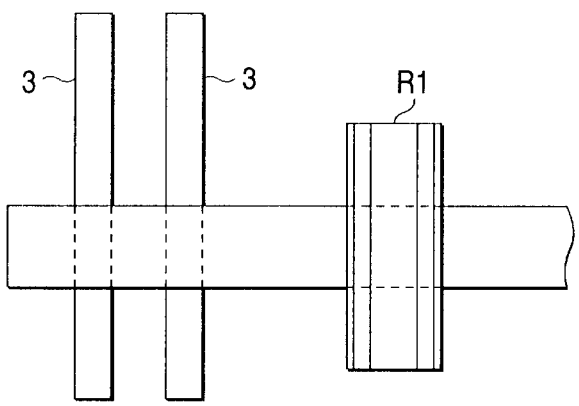
FIG. 3A is a plan view showing a first method of covering a lead with resin.
FIG. 3B is a sectional view showing the first method.
Figure 3:
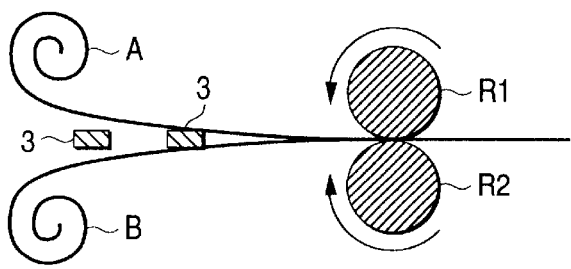

The lead 3 can be covered with the covering resin 31 using the following two kinds of techniques. In the first technique, as shown in FIGS. 3A and 3B, two sheets of resins A and B each being a laminate of resin films having different softening points are transferred between two opposite hot rolls R1 and R2. While the resins transfer, the lead 3 having a prescribed length is inserted in between the resin A and resin B before it passes the hot rolls. Then, while the lead 3 passes the hot rolls, the inner resin film is deposited to the lead 3. At the portion where the lead 3 is not inserted, the resins A and B are deposited to each other. The resins are cut so that the respective leads 3 are independent of one another. Thus, covering of the lead 3 with the covering resin 31 is completed.

Figure 4:
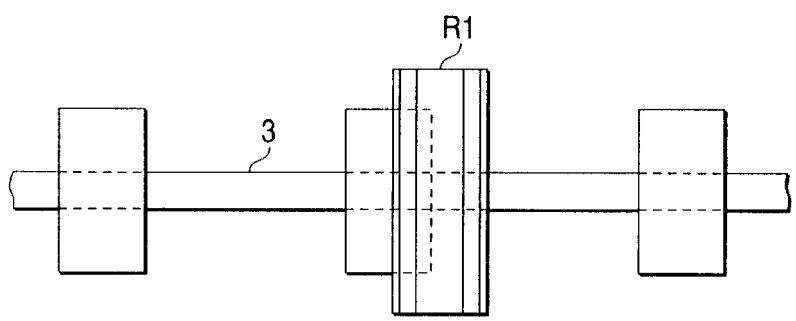
FIG. 4A is a plan view showing a second method of covering a lead with resin.
FIG. 4B is a sectional view showing the second method.
Figure 4:
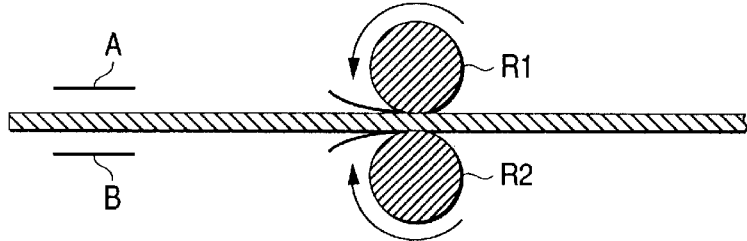

In the second method, as shown in FIGS. 4A and 4B, a single lengthy lead material are intermittently sandwiched at a prescribe pitch from its both sides by laminated strip-shaped resins A and B. After the lead has been passed between the rolls, it is cut into prescribed lengths.

In both first and second methods, at the depositing position, instead of the hot rolls, flat hot plates which can freely approach or leave each other may be used.

The battery according to this embodiment can be manufactured as follows. First, two pieces of the covering resins 31 with only the outer layer 31a colored and crosslink-coupled are prepared. With these covering resins sandwiching the lead 3 at a prescribed portion thereof, the covering resins 31 are thermally deposited to each other and the lead 3 is fixed to the covering resins. At this time, the outer layer 31a serving as a crosslink-combining portion has a high softening point and hence not deformed at a high temperature. Therefore, its shape is maintained. On the other hand, the inner layer 31a is not crosslink-coupled and has a low softening point. Therefore, the inner layer is brought into intimate contact with the lead even while the shape of the outer layer is maintained.

Next, the lead 3 is connected to the electrode plate of the power generating element 2. The resultant assembly is wrapped with a film serving as a material of the battery case so that the covering resins 31 cross the edges 41 of the film. At this time, the covering resins 31 are colored and maintained in their shape. Therefore, the positions of the covering resins 31 can be detected accurately by an optical sensor.

The edges of the film wrapping the power generating element 2 are thermally deposited to each other and to the covering resins 31. Thus, the film forms a shape corresponding the battery case 4 having a shape of a flat sack. In this case, with the other edges 42 of the film opposite to the lead 3 being opened, an electrolytic solution is injected from the opened edges so that it is penetrated in the separator. Thereafter, the other edges 42 are thermally deposited to each other. Thus, the battery 1 is completed.

In this embodiment, the respective components of the battery may be the materials which are conventionally employed. Further, in this embodiment, although the covering resin 31 covering the lead 3 is colored resin, it may be non-colored resin.

The evaluation result of deposition when the lead 3 is sandwiched by the covering resins 31 using the hot plate and the lead 3 and the covering resins 31 are deposited to each other under the following condition is shown in Table 1.

The lead material: aluminum (Al 99.9 weight %) having a width of 4 mm and a thickness of 0.1 mm.

The deposition time: 3 sec.

TABLE 1

| Sample No. | Hot plate temperature ° C. | Resin (inner layer) Material | Softening point ° C. | Resin (outer layer) Material | Softening point ° C. | Deposition property g/cm |
|---|---|---|---|---|---|---|
| 1 | 180 | de-natured LDPE | 96 | P-LDPE | 112 | 780 |
| 2 | 220 | de-natured PP | 121 | CPP | 200 | 880 |
| 3 | 180 | de-natured P-LDPE | 100 | cross-linked P-LDPE | 131 | 920 |
| 4 | 220 | de-natured HDPE | 105 | cross-linked HDPE | 138 | 770 |
| 5 | 220 | de-natured MDPE | 121 | cross-linked MDPE | 130 | 900 |

Note: The deposition was evaluated by measuring the pulling strength between aluminum that is a lead material and resin. If the pulling strength is 500 g/cm, the hermeticity necessary between the lead material and resin films is satisfactory.

Further, the evaluation result of deposition when the lead 3 is sandwiched by the covering resins 31 using the hot plate and the lead 3 and the covering resins 31 are deposited to each other is shown in Table 1.

The lead material: aluminum (Al 99.9 weight %) having a width of 4 mm and a thickness of 0.1 mm.

The hot plate temperature: 170° C. The deposition time: 3 sec.

TABLE 2

| Sample No. | Resin (inner layer) Material | Softening point ° C. | Resin (outer layer) Material | Softening point ° C. | Deposition property g/cm |
|---|---|---|---|---|---|
| 1 | denatured LDPE | 96 | P-LDPE | 112 | 680 |
| 2 | denature PP | 121 | CPP | 200 | 740 |
| 3 | denatured P-LDPE | 100 | crosslinked P-LDPE | 131 | 880 |
| 4 | denatured HDPE | 105 | crosslinked HDPE | 138 | 700 |
| 5 | denatured MDPE | 121 | crosslinked MDPE | 130 | 820 |

Note: The deposition was evaluated by measuring the pulling strength between aluminum that is a lead material and resin. If the pulling strength is 500 g/cm, the hermeticity necessary between the lead material and resin films is satisfactory.

Incientally, the inner layer and the outer layer of the samples in Tables 1 and 2 has the thickness of 50 μm, respectively.

Further, in order to examine the hermeticity between the covering resin and the battery case, the following test was carried out and evaluated. Two leads of Al having a width of 4 mm and thickness of 100 μm are individually covered with the resin 31 composed of the outer layer 31a of acid-denatured low-density polyethylene crosslink-coupled by using electron beams so that the gel percent is 35% and the inner layer 31b having the same acid-denatured low-density polyethylene except not crosslink-coupled. These two leads covered with the covering resin, spaced apart by 15 mm from each other, are joined with a film composed of a surface protection layer of PET having a thickness of 12 μm, a barrier layer of Al having a thickness of 25 μm and a deposition layer of PP having a thickness of 60 μm. Thereafter, the covering resin and the film are deposited by a hot roll set at 230° C. The deposited portion, when tested by a He detector, did not leak. The leads were insulated from each other.

For comparison, the covering resin with the outer layer 31*a* having the same acid-denatured low-density polyethylene, which is not crosslinked, as the inner layer 31*b* was deposited to the film. The deposition portion, when tested by the He detector, leaked. However, the leads were insulated from each other.

In accordance with this embodiment, the covering resin 31 for covering the lead 3 is composed of a plurality of layers 31*a* and 31*b* and the outermost layer 31*a* serves as a crosslink-coupled portion. Therefore, the outermost layer 31*a* has a higher softening point than the innermost layer 31*b*. Thus, a low-profiled battery with excellent contact and hermeticity among the lead 3, covering resin 31 and battery case can be obtained. Incidentally, in this embodiment, although the resin 31 covering the lead 3 is composed of two layers, it may be a single layer with a surface crosslink-coupled on the side of the film. In addition, the coloring may be carried out as occasion demands.

What is claimed is:

1. A battery sealed in a battery case of a resin film comprising:
    a power generating element;
    a lead connected to the power generating element;
    a covering resin for covering a prescribed portion of said lead, having an outer portion and an inner portion, softening point of the outer portion being higher than that of the inner portion;
    a battery case comprising a laminate film of a metallic foil and a resin film, in which said power generating element is housed in said battery case by depositing edges of the laminate film and depositing said covering resin and the edges of the laminate film.

2. The battery according to claim 1, wherein said covering resin is formed of denatured polyolefine, and said outer portion is crosslink-coupled by irradiation of electron beams.

3. The battery according to claim 2, wherein said covering resin comprises a plurality of layers stacked in its thickness direction and at least its outermost layer is crosslink-coupled by irradiation of electron beams.

4. The battery according to claim 3, wherein a gel percent of said outermost layer of the covering resin is 20% to 90%.

5. The battery according to claim 1, wherein said covering resin comprising a plurality of layers stacked in its thickness direction and its outermost layer has a higher softening point than that of its innermost layer.

6. The battery according to claim 5, wherein said covering resin comprises two layers each having a thickness of 10 μm to 200 μm and a difference between the softening points of both layers is 5° C. to 100° C.

7. The battery according to claim 1, wherein said covering resin is colored.

8. The battery according to claim 7, wherein said covering resin is made of denatured polyolefine and doped with a coloring agent of 0.1 to 5 wt %.

9. The battery according to claim 2, wherein said covering resin is colored.

10. The battery according to claim 3, wherein said covering resin is colored.

11. The battery according to claim 4, wherein said covering resin is colored.

12. The battery according to claim 5, wherein said covering resin is colored.

13. The battery according to claim 6, wherein said covering resin is colored.

* * * * *